(12) United States Patent
Fahl

(10) Patent No.: US 12,271,967 B2
(45) Date of Patent: Apr. 8, 2025

(54) COMPARATIVE SEARCHING IN A REAL ESTATE SEARCH ENGINE

(71) Applicant: R.E. Data Lab, Inc., Denver, CO (US)

(72) Inventor: Scott Robert Fahl, Denver, CO (US)

(73) Assignee: R.E. Data Lab, Inc., Denver, CO (US)

( * ) Notice: Subject to any disclaimer, the term of this patent is extended or adjusted under 35 U.S.C. 154(b) by 18 days.

(21) Appl. No.: 17/991,325

(22) Filed: Nov. 21, 2022

(65) Prior Publication Data
US 2023/0162302 A1 May 25, 2023

Related U.S. Application Data

(60) Provisional application No. 63/281,272, filed on Nov. 19, 2021.

(51) Int. Cl.
*G06Q 50/16* (2024.01)
*G06Q 40/06* (2012.01)
*G06Q 50/163* (2024.01)

(52) U.S. Cl.
CPC .......... *G06Q 50/163* (2013.01); *G06Q 40/06* (2013.01)

(58) Field of Classification Search
CPC ...................................... G06Q 50/16
See application file for complete search history.

(56) References Cited

U.S. PATENT DOCUMENTS

| | | |
|---|---|---|
| 4,870,576 A | 9/1989 | Tornetta |
| 5,032,989 A | 7/1991 | Tornetta |
| 6,385,541 B1 | 5/2002 | Blumberg et al. |
| 6,578,011 B1 | 6/2003 | Forward |
| 6,847,943 B2 | 1/2005 | Dubner |
| 6,985,902 B2 | 1/2006 | Wise et al. |
| 7,254,559 B2 | 8/2007 | Florance et al. |
| 7,415,356 B1 | 8/2008 | Gowda et al. |
| 7,640,204 B2 | 12/2009 | Florance et al. |
| 7,747,545 B2 | 6/2010 | Gleim et al. |
| 7,949,589 B2 | 5/2011 | Halpin |
| 7,970,674 B2 | 6/2011 | Cheng et al. |
| 8,051,089 B2 | 11/2011 | Gargi et al. |
| 8,060,450 B2 | 11/2011 | Brock |
| 8,095,434 B1 | 1/2012 | Puttick et al. |
| 8,140,421 B1 | 3/2012 | Humphries et al. |
| 8,209,232 B2 | 6/2012 | Callow et al. |
| 8,468,084 B2 | 6/2013 | Roberts et al. |
| 8,510,349 B1 | 8/2013 | Puttick |

(Continued)

*Primary Examiner* — Edward Chang

(57) ABSTRACT

A system for investment real estate searching is described that includes software that ingests real estate data from a plurality of data sources. The real estate data indicates properties and corresponding property characteristics, and the real estate data is normalized and stored in a data store. A subset of the properties are identified that include investment characteristics derived from the corresponding property characteristics. Investment data is generated that indicates the investment characteristics and investor activity for each of the subset of properties. A search request is received that specifies a geographic area and an investment type. In response to receiving the search request, it is algorithmically resolved based in part on comparing it to the investment data to generate a search result that indicates potential investment properties from the subset, and the search result is provided to the requesting device.

20 Claims, 14 Drawing Sheets

(56) References Cited

U.S. PATENT DOCUMENTS

| | | |
|---|---|---|
| 8,515,839 B2 | 8/2013 | Ma et al. |
| 8,676,680 B2 | 3/2014 | Humphries et al. |
| 8,718,612 B2 | 5/2014 | Calman et al. |
| 8,832,115 B2 | 9/2014 | Smintina et al. |
| 8,832,136 B1 | 9/2014 | Billman et al. |
| 8,838,504 B2 | 9/2014 | Eraker et al. |
| 9,076,185 B2 | 7/2015 | Orfano |
| 9,105,061 B2 | 8/2015 | Eraker et al. |
| 9,141,640 B2 | 9/2015 | Tadman et al. |
| 9,213,461 B2 | 12/2015 | Eraker et al. |
| 9,361,583 B1 | 6/2016 | Holloway et al. |
| 9,406,082 B2 | 8/2016 | Smedberg et al. |
| 9,424,305 B1 | 8/2016 | Puttick |
| 9,436,945 B2 | 9/2016 | Eraker et al. |
| 9,536,148 B2 | 1/2017 | Gross |
| 9,605,704 B1 | 3/2017 | Humphries et al. |
| 9,706,011 B2 | 7/2017 | Smedberg et al. |
| 9,754,333 B1 | 9/2017 | Blumberg et al. |
| 9,852,447 B2 | 12/2017 | Eraker et al. |
| 9,965,773 B2 | 5/2018 | Fan et al. |
| 9,990,639 B1 | 6/2018 | Kong et al. |
| 10,078,679 B1 | 9/2018 | Shefferman et al. |
| 10,198,735 B1 | 2/2019 | Humphries et al. |
| 10,332,138 B1 | 6/2019 | Bruce et al. |
| 10,375,306 B2 | 8/2019 | Shan et al. |
| 10,380,653 B1 | 8/2019 | Flint et al. |
| 10,521,191 B1 | 12/2019 | Puttick |
| 10,521,943 B1 | 12/2019 | Phillips et al. |
| 10,530,997 B2 | 1/2020 | Shan et al. |
| 10,643,232 B1 | 5/2020 | Wang et al. |
| 10,643,386 B2 | 5/2020 | Li et al. |
| 10,706,465 B2 | 7/2020 | D'Souza et al. |
| 10,754,884 B1 | 8/2020 | Daimler et al. |
| 10,783,530 B1 | 9/2020 | Lange et al. |
| 10,789,549 B1 | 9/2020 | Bruce et al. |
| 10,789,658 B1 | 9/2020 | Holloway et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 10,896,449 B2 | 1/2021 | Ma et al. |
| 10,984,489 B1 | 4/2021 | Bruce et al. |
| 11,023,937 B2 | 6/2021 | Phillips et al. |
| 2002/0020088 A1 | 2/2002 | Kreutner |
| 2004/0030640 A1 | 2/2004 | Mahnken et al. |
| 2005/0015326 A1 | 1/2005 | Terry |
| 2005/0288959 A1 | 12/2005 | Eraker et al. |
| 2006/0190278 A1 | 8/2006 | Zimmerman et al. |
| 2006/0256109 A1 | 11/2006 | Acker et al. |
| 2006/0265312 A1 | 11/2006 | Rascoff et al. |
| 2007/0043770 A1 | 2/2007 | Goodrich et al. |
| 2007/0050342 A1 | 3/2007 | Inkinen et al. |
| 2008/0077458 A1 | 3/2008 | Andersen et al. |
| 2008/0154774 A1 | 6/2008 | Dennison et al. |
| 2008/0228675 A1 | 9/2008 | Duffy et al. |
| 2009/0043906 A1 | 2/2009 | Hurst et al. |
| 2010/0145821 A1 | 6/2010 | Callow et al. |
| 2012/0005122 A1 | 1/2012 | Khan et al. |
| 2013/0041841 A1 | 2/2013 | Lyons |
| 2013/0138475 A1 | 5/2013 | Allison et al. |
| 2013/0151378 A1 | 6/2013 | Goodrich et al. |
| 2013/0304654 A1 | 11/2013 | Ma et al. |
| 2014/0025657 A1 | 1/2014 | Dorfman |
| 2014/0040072 A1 | 2/2014 | Leavy et al. |
| 2014/0143644 A1 | 5/2014 | Smedberg et al. |
| 2014/0207574 A1 | 7/2014 | Fan et al. |
| 2014/0236845 A1 | 8/2014 | Humphries et al. |
| 2015/0052080 A1 | 2/2015 | Letzeiser |
| 2015/0254681 A1 | 9/2015 | Mahnken et al. |
| 2016/0027051 A1 | 1/2016 | Gross |
| 2016/0048906 A1 | 2/2016 | Eraker et al. |
| 2016/0048934 A1 | 2/2016 | Gross |
| 2016/0217523 A1 | 7/2016 | Goodrich et al. |
| 2017/0243296 A1 | 8/2017 | Lyons |
| 2017/0341525 A1 | 11/2017 | Dubrovsky et al. |
| 2018/0007169 A1 | 1/2018 | Smedberg et al. |
| 2018/0159838 A1 | 6/2018 | Dintenfass |
| 2018/0225713 A1 | 8/2018 | Eraker et al. |
| 2019/0020816 A1 | 1/2019 | Shan et al. |
| 2019/0306424 A1 | 10/2019 | Boyadzhiev et al. |
| 2019/0333175 A1 | 10/2019 | Rose et al. |
| 2020/0272820 A1 | 8/2020 | Lim et al. |
| 2020/0333156 A1 | 10/2020 | Vijayaraghavan et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0021761 A1 | 1/2021 | Shan et al. |
| 2021/0044759 A1 | 2/2021 | Dawson et al. |
| 2021/0044760 A1 | 2/2021 | Dawson et al. |
| 2021/0064216 A1 | 3/2021 | Li et al. |
| 2021/0125397 A1 | 4/2021 | Moulon et al. |
| 2021/0142564 A1 | 5/2021 | Impas et al. |
| 2023/0130143 A1* | 4/2023 | Chandy ............... G06F 16/9535 705/27.2 |

\* cited by examiner

ACTIVE Listed 16 days ago

1 / 37

$420,000

4844 Van Zandt Drive
Fort Worth, TX 76244

Beds 4  Sq Ft 3,110  Stories 2
Baths 3  Type Single Family

Built 2006
Lot 5,489

420K

35W PARK GLEN
SUMMERFIELDS
FOSSIL PARK
377
Keller
377

800

MLS DETAILS  COMPARABLES  PREVIOUS SALE  PUBLIC RECORDS  MORTGAGE HISTORY  PROPERTY HISTORY  TAX & ASSESSMENT

MLS DETAILS
This property is Active

FIGURE 8

COMPARATIVE SEARCHING IN A REAL ESTATE SEARCH ENGINE

RELATED APPLICATIONS

This U.S. patent application claims the benefit of and priority to U.S. Provisional Patent Application 63/281,272 entitled, "COMPARATIVE SEARCHING IN A REAL ESTATE SEARCH ENGINE" which was filed on Nov. 19, 2021, and which is hereby incorporated by reference in its entirety for all purposes.

BACKGROUND

A search engine is an information retrieval system that provides resource identification services for user devices like computers or smartphones. The search engine provides an interface that allows a user to input search criteria referred to as a search query. The search query typically includes a text-based user input into a user interface. The search engine processes the search query and identifies items in its search database that match the search query. Typically, one or more of the characters, words, or numbers entered into the search query are used to match to the item. Processing may include identifying synonyms to match items, but typically the search involves identifying a match between some portion of the search query and some portion of the item. The search engine uses the identified items to generate a search result. The search engine presents the search result on the user device for the user. Search engines may utilize internets, wireless communication networks, local area networks, and the like to interface with user devices. Exemplary search engines include desktop search engines, federated search engines, metasearch engines, web search engines, and specialized search engines. Specialized search engines may include search engines for a specific type of data, such as real estate search engines or film and television search engines, or specialized search engines may include search engines for a specific format of data, such as template search engines or image search engines.

A real estate search engine may provide an interface for a user to search for properties. Typically, the real estate search engine includes a map of a geographic area that indicates the locations of properties and a search bar. A user may generate search queries by interacting with the map to select locations of interest and/or by entering a text-based search query into the search bar. The real estate search engine typically generates a search result of properties that are currently available to purchase in response to the search query input by the user such that the resulting properties meet the user's input criteria for things such as number of bedrooms, square footage, number of bathrooms, and the like. The search result may include information on the returned properties, including property locations, property characteristics, property prices, and the like. Unfortunately, real estate search engines do not effectively generate search results that compare or identify properties having non-quantitative characteristics, such as for real estate investing. Accordingly, real estate search engines do not efficiently identify potential investment properties based on their investment type and their property characteristics.

BRIEF DESCRIPTION

Non-limiting examples of the present disclosure describe systems, methods, and devices for comparative real estate investing searching. Some embodiments may include a method of operating a real estate investment search engine to perform comparative searching. The method may include ingesting, from multiple data sources, real estate data that indicates properties and their characteristics and storing the real estate data. The method may further include identifying a subset of the properties having investment characteristics derived from the corresponding property characteristics. The method may further include generating investment data that indicates the investment characteristics and investor activity for the subset of properties based on the real estate data. The method may further include receiving a search request that specifies a geographic area and an investment type from a user device. The method may further include in response to the search request, algorithmically resolving the search request based in part on comparing the search request to the investment data to generate a search result that indicates potential investment properties from the subset and transmit the search result to the user device.

Optionally, the comparing may include identifying the geographic area from the search request and locating one or more properties from the subset having property locations within the geographic area as the potential investment properties. Optionally, the comparing may include identifying the investment type from the search request and selecting one or more properties of the subset that include investment characteristics and investor activity that correspond to the investment type as the potential investment properties. Optionally, the comparing may include locating one or more properties having property locations within the geographic area and then selecting from the one or more properties in the geographic area at least one property having investment characteristics and investor activity corresponding to the investment type as the potential investment properties. Optionally, the method may include determining an investment success indicator for each of the potential investment properties, ranking the potential investment properties based on the investment success indicators, and indicating the ranking of the potential investment properties in the search result. Optionally, the method may include generating a map that includes an indication of the location of each of the potential investment properties and transmitting the map with the search results to the user device. Optionally, the corresponding property characteristics for each of the potential investment properties may be transmitted with the search results to the user device. Optionally, the investment type may include one or more of holding, flipping, tear down and rebuild, story addition, short-term rental, long-term rental, multi-family, land, off-market, and mobile. Optionally, the investment characteristics may include one or more of After Repair Value (ARV), appreciation, size, price, short term rental equations, long term rental equations, capitalization rate, Return on Investment (ROI), cash-on-cash return, equity, net monthly cash flow, gross yield, net ROI, all in cost to ARV, net profit/sales process, holding time, asking price to sell ratio, and debt coverage ratio. Optionally, the data sources may include one or more multiple listing source (MLS) for a specified region.

The systems, hardware, and software for performing comparative real estate investment searching may include methods that are performed by a computing device. The systems may include a computer-readable storage media device, a computing system, or the like such that a memory stores instructions that are executed by or executable by one more processors to perform the method or that cause the processor to perform the steps described.

BRIEF DESCRIPTION OF THE DRAWINGS

Non-limiting and non-exhaustive examples are described with reference to the following figures.

FIG. 8 illustrates an exemplary user interface of a real estate search system to perform comparative real estate investment searches.

DETAILED DESCRIPTION

Figure 1:
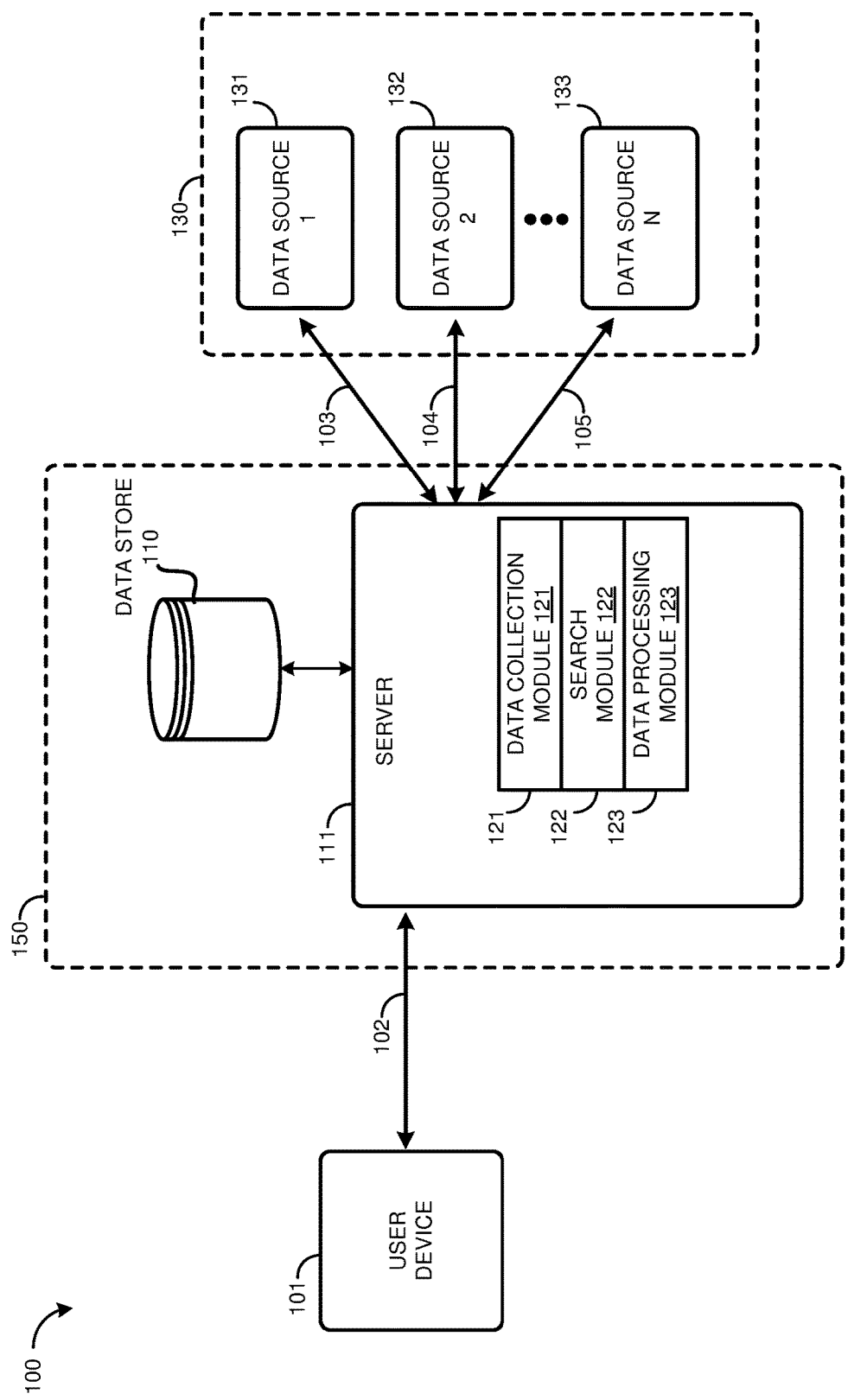
FIG. 1 illustrates a real estate search system to perform comparative real estate investment searches.

Various embodiments will be described in detail with reference to the drawings. Like reference numbers represent like parts throughout the drawings. The described embodiments are not limiting in that examples set forth in this specification are not intended to be limiting and instead set forth some of the many possible embodiments.

Traditional real estate search systems generate search results that identify properties available for purchase in response to a user query. The search results include information regarding the individual properties such as price, location, number of rooms, square footage, and the like. However, traditional real estate search systems are inadequate with regards to identifying investment properties for purchase. The data used to identify current or former investment properties is not readily available for a given location. There is not an existing clear characteristic where a property may be identified as an investment property. Further, any given property may be an investment property for one transaction, but not an investment property in the next. For example, if an investor purchases a property to use as a rental, the property is an investment property for the transaction in which the investor purchases the property. However, if the investor sells the property after determining it is no longer a property the investor wishes to own, the property may not be an investment property for the purposes of the sale to the next owner, who may use it as a primary residence. Accordingly, a property may change status over time from an investment property to a non-investment property. Identifying the type of property in any given sales transaction is not a value that is tracked with typical property characteristics (e.g., square footage, number of rooms, and the like). Moreover, gathering and aggregating the data used to identify a property as an investment property for any given transaction is difficult due to the amount of data, the large number of locations indicated by the data, the format of the data, and the type of data provided by various data sources. Accordingly, traditional real estate search systems are limited to providing search results that provide only quantitative data about a property including values such as the geographic location, the listing price, the number of rooms, the square footage, the size of the lot, and the like.

As mentioned above, there is no straightforward way to search for properties that are currently or were previously used for investment purposes. Described herein is a solution that provides a real estate investing search engine capable of identifying investment properties and making comparative analysis to provide insights to an investor searching for new opportunities.

Systems and methods are provided that obtain relevant investment information from a myriad of sources, normalizes the information, and uses algorithms to identify properties that were or currently are used for investment purposes. The system inputs the information to the algorithms to identify and provide information on potential investment properties out of the existing pool of available properties. This solution allows the investor to easily find potential investment properties and compare these properties to other investment properties, providing technology not previously available from traditional real estate search systems.

The systems, methods, and devices described throughout provide technical advantages for comparative real estate investment searching. The algorithms described to identify investment characteristics and use those characteristics to identify investment properties from the pool of available properties did not previously exist. While users could painstakingly look at all available data on all the available properties, the process takes weeks and is very limited in identifying potential investment properties. Using the algorithms disclosed herein, previous investment properties are used to identify future investment properties, and the information about those previous investments can help rank the value of the potential investment properties. This technology simply was not previously available and will save investors hundreds of hours of time. Further, once a property for a given transaction is identified as a type of potential investment property, the information may be saved so that the analysis need only be performed once, but can be provided to countless investors, further saving many hours of time as well as computational processing time.

Figure 2:
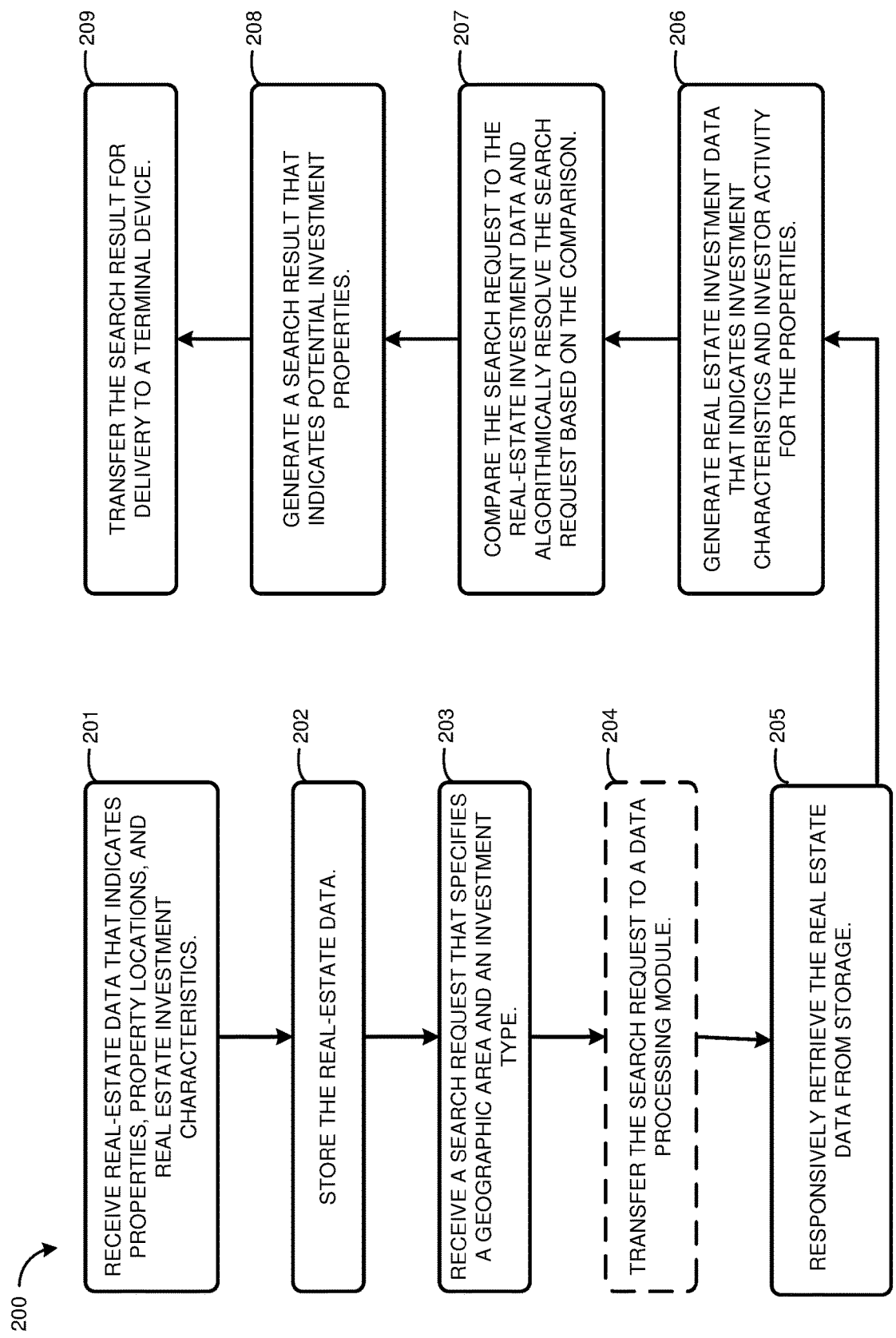
FIG. 2 illustrates an exemplary operation of the real estate search system to perform comparative real estate investment searches.

FIG. 1 illustrates real estate search system 100. Real estate search system 100 includes user device 101, data sources 130, and real estate search service 150. Real estate search service 150 provides search engine services to user device 101 such as property searching, comparative real estate investment searching, real estate investment characterizing, and/or other types of search engine products. Real estate search service 150 includes data center 110 and server 111. While a single data center 110 and single server 111 is depicted for the ease of description, any size and number of data centers 110 and server 111 may be used to provide the functionality described without departing from the spirit of the description. Data center 110 includes server 111. Server 111 includes storage device 112 which stores data collection module 121, search module 122, and data processing module 123. Server 111 executes modules 121-123 to implement process 200 that is illustrated in FIG. 2 to drive the operation of real estate search system 100. Data sources 130 includes individual data sources 131-133.

Various examples of network operation and configuration are described herein. In some examples, data collection module 121 receives real estate data that indicates properties, property locations, property information, and the like from data sources 130. The real estate data may indicate mortgage data, loan amount data, interest rate, owner information, title information, listing history, demographic data, tax assessment data, assessor records data, and/or comparable data. The real estate data may further include housing characteristics like house type, number of stories, number of bedrooms, number of bathrooms, number of garages, square footage, location within a neighborhood, and the like. For example, server 111 may execute data collection module 121 and responsively receive Multiple Listing Service (MLS) data from data source 131. Data collection module 121 may store the real estate data. In some examples, data collection module 121 populates data store 110 with the real estate data in a database format. The data store 110 may retain the real estate data in any organizational format. For example, the real estate data may be organized by type, location, and the like to facilitate efficient data retrieval.

Search module 122 may receive a search request that specifies a geographic area and an investment type from user device 101. For example, the geographic area may indicate a city, polity, neighborhood, property location, and the like. For example, the investment type may indicate an investment strategy, price range, property type, property characteristics, capitalization rate, net operating income, cash on cash return, and the like. An investment type may be, for example, buy and hold, fix and flip, pop top, tear down and rebuild, short- or long-term rental, and the like. Search module 122 transfers the search request to data processing module 123. In response, data processing module 123 retrieves the real estate data from data store 110. Data processing module 123 generates real estate investment data that indicates investment characteristics and investor activity of the properties based on the real estate data. In some examples, data processing module 123 may generate the real estate investment data based on additional criteria like property owner details, acquisition and selling details, and investment metrics. Data processing module 123 compares the search request to the real estate investment data and algorithmically resolves the search request based on the comparison. For example, the search request may indicate an investment type and a geographic area. Data processing module 123 may execute a comparison algorithm that takes the investment type and geographic area as inputs, identifies other properties which include investment characteristics and locations related to the investment type and the geographic area, and generates an output that includes information characterizing the identified properties.

Data processing module 123 may generate a search result that indicates potential investments properties and transfers the search result to search module 122. Search module 122 transfers the search result for delivery to user device 101. For example, search module 122 may provide a graphical presentation of the search result for display on a display screen of user device 101. The depicted modules 121-123 are used for ease of description, and the described functionality may be provided in more or fewer modules.

Advantageously real estate search system 100 effectively generates search results that compare properties for real estate investing. Moreover, real estate search system 100 efficiently identifies potential investment properties based on their investment type and property characteristics.

Data center 110 includes server computers and data storage devices deployed on-premises, in the cloud, in a hybrid cloud, or elsewhere, by content providers such as enterprises, organizations, individuals, and the like. The server computers include microprocessors, software, memories, transceivers, bus circuitry, and the like. Data center 110 may rely on the physical connections provided by one or more other network providers such as transit network providers, Internet backbone providers, and the like to interface with user device 101 and data sources 130. Data sources 130 include real estate data repositories like Multiple Listing Services (MLS), county record real estate data services, online real estate listings, and the like. Data sources 130 may include data storage systems, data centers, cloud computing systems, and the like. The various systems utilized by data sources 130 may include microprocessors, software, memories, transceivers, bus circuitry, and the like. Data sources 130 may provide data to real estate search service 150 through, for example, subscription agreements, one-time data provisions, or any other agreement. The agreement may allow for push or pull data retrieval by real estate search service 150. User device 101 includes microprocessors, software, memories, transceivers, bus circuitry, and the like. Although user device 101 is represented as a desktop computer, user device may include a laptop computer, tablet computer, server, smartphone, smartwatch, or some other type of computing device with wireless or wireline connectivity.

The microprocessors include Central Processing Units (CPU), Graphical Processing Units (GPU), Digital Signal Processors (DSP), Application-Specific Integrated Circuits (ASIC), Field Programmable Gate Arrays (FPGA), and the like. The memories include Random Access Memory (RAM), flash circuitry, disk drives, and/or the like. The memories store software like operating systems, modules, user applications, and system applications. The microprocessors retrieve the software from the memories and execute the software to drive the operation of real estate search system 100 as described herein.

Links 102-105 use metal, glass, air, or some other media. Links 102-105 use IEEE 802.3 (Ethernet), Time Division Multiplex (TDM), Data Over Cable System Interface Specification (DOCSIS), Internet Protocol (IP), Hypertext Transfer Protocol (HTTP), WIFI, virtual switching, inter-processor communication, bus interfaces, and/or some other data communication protocols. Links 102-105 may include intermediate network elements like relays, routers, and controllers.

FIG. 2 illustrates process 200. Process 200 includes an exemplary operation of a real estate search system (e.g., real estate search system 100) to perform comparative real estate investment searches. The operation of process 200 may differ in other examples. Real estate data is received by, for example, a data collection module (e.g., data collection module 121). The real estate data may indicate properties and property locations (step 201). For example, the real estate investment characteristics may indicate property value appreciation, property owner details, acquisition and selling details, investment metrics, investment type, and the like. The data collection module stores the real estate data (step 202). A search request is received by, for example, a search module (e.g., search module 122). The search request may specify a geographic area and an investment type (step 203). For example, the search request may specify a geographic area such as a city, country, or user drawn perimeter on a map. The investment type specified in the search request includes investment strategies such as, for example, buy and hold, fix and flip, pop top, tear down and rebuild, short- or long-term rental, and the like. The search request may include additional relevant criteria like a price range, property type (e.g., condominium), number of bedrooms and bathrooms, acreage, square footage, and the like.

The search module may transfer the search request to a data processing module (e.g., data processing module 123) (optional step 204). In response to receiving the search request by the real estate search service, the real estate data is retrieved from data storage (step 205). Real estate investment data is generated by, for example, the data processing module. The real estate investment data indicates investment characteristics and investor activity for the properties (step 206). For example, the data processing module may generate the real estate investment data based on property owner details, location and demographic information, acquisition and selling details, and investment metrics of the properties. The search request is compared to the real estate investment data by, for example, the data processing module and the search request is resolved algorithmically based on the comparison (step 207). The data processing module may compare the property characteristics specified in the search request with the real estate investment data to identify a set of properties that meets the specifications of the request. For example, the request may specify two-story houses and a fix and flip investment strategy, and the data processing module processes the real estate investment data to identify properties that are two-story houses suitable for a fix and flip. The data processing module may utilize machine learning, a neural network, or another type of artificial intelligence to algorithmically resolve the search request.

A search result is generated that indicates potential investment properties by, for example, the data processing module (step 208). The search result may be transferred to the search module. The search result includes the output of the algorithmic resolution. For example, the algorithmic resolution may identify and rank a set of potential investment based on their likelihood to be successful investments and the data processing module may generate a search result that indicates the ranks. The search result is transferred for delivery to a user device (e.g., user device 101) (step 209). For example, the search module may generate web page and graphically present the search result on a display screen of the user device. The graphical presentation may include a map that illustrates the locations of the potential investment properties, photographs of the properties, and lists that describe investment attributes (e.g., estimated return on investment) of the potential investment properties.

The artificial intelligence (AI) used in the system (e.g., to algorithmically resolve the search request) may include supervised learning, unsupervised learning, semi-supervised learning, reinforcement learning, or any other type of learning. The types of AI processing may include, for example, machine learning, neural networks, deep neural networks, and/or any other type of AI processing. Non-limiting examples may include nearest neighbor processing; naive bayes classification processing; decision trees; linear regression; support vector machines (SVM) neural networks, perceptron networks, feed forward neural networks, deep feed forward neural networks, multilayer perceptron networks, deep neural networks (DNN), convolutional neural networks (CNN), radial basis functional neural networks, recurrent neural networks (RNN), long short-term memory (LSTM) networks, sequence-to-sequence models, gated recurrent unit neural networks, auto encoder neural networks, variational auto encoder neural networks, denoising auto encoder neural networks, sparse auto encoder neural networks, Markov chain neural networks, Hopfield neural networks, Boltzmann machine neural networks, restricted Boltzmann machine neural networks, deep belief networks, deep convolutional networks, deconvolutional networks, generative adversarial networks, liquid state machine neural networks, extreme learning machine neural networks, echo state networks, deep residual networks, Kohonen networks, neural turing machine neural networks, modular neural networks, transformers, clustering processing including k-means for clustering problems, hierarchical clustering, mixture modeling, application of association rule learning, application of latent variable modeling, anomaly detection, assumption determination processing; generative modeling; low-density separation processing and graph-based method processing, value-based processing, policy-based processing, model-based processing, and the like.

Figure 3:
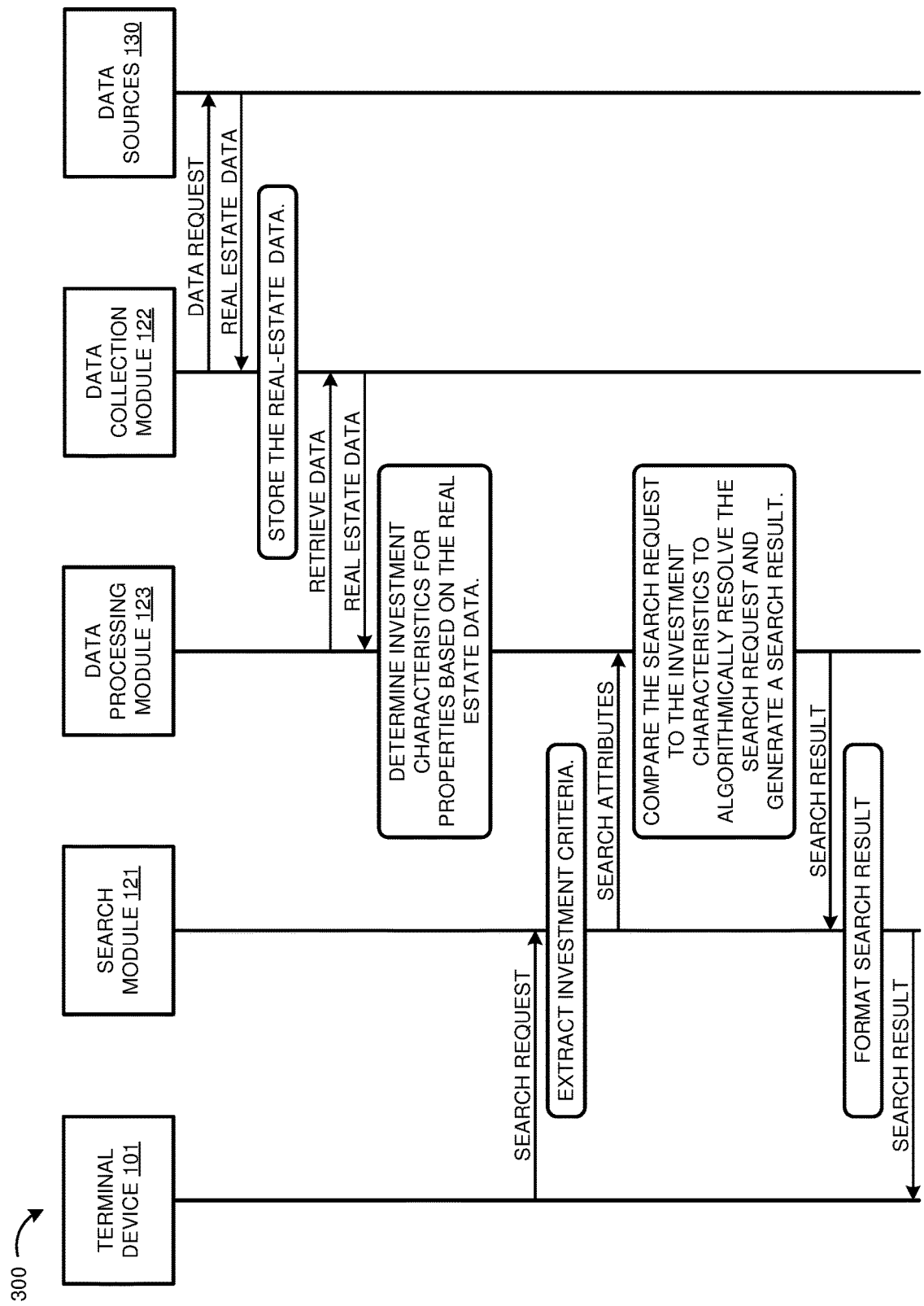
FIG. 3 illustrates an exemplary swim diagram of an operation of the real estate search system to perform comparative real estate investment searches.

FIG. 3 illustrates an exemplary data flow of real estate search system 100 to perform comparative real estate investment searches. In other examples, the operation and structure of real estate search system 100 may differ. Data collection module 121 ingests real estate data from data sources 130. Data sources 130 transfer the real estate data to data collection module 121. In some examples, data sources 130 transfer pre-formatted real estate data, while in other examples, data sources 130 transfer raw real estate data. The real estate data may include MLS data, public record data, short term rental data, long term rental data, and/or other types of real estate investment data. The real estate data indicates properties, their locations, real estate investment characteristics of the properties, and investor activity of the properties. Data collection module 121 receives the real estate investment data and subsequently stores the received data in memory. For example, data collection module 121 may populate and manage a real estate data based that categorizes the data ingested from sources 130.

Data processing module 123 retrieves the real estate data from storage. Data processing module 123 processes the real estate data to determine real estate investment characteristics for the properties indicated by the data. For example, data processing module 123 determines investment data like the length of time between purchase and sale, change in price between sales, homeowner mailing addresses, rental data, change in square footage between sales, change in year built between sales, and/or change in house stories between sales. A short length of time between sales and/or an increase in price above market value for a property may indicate a house flip of a property. An owner mailing address that differs from the address of the property may indicate the property is a rental. A change in square footage and/or year built between sales may indicate a tear-down and rebuild. A change in house stories may indicate an addition made to the property. Data processing module 123 generates investment data for each of the properties indicated by the real estate data that characterizes the investment attributes classifies the investment types for each of the properties. Data processing module 123 stores the investment data in association with the properties.

User device 101 transfers a search request to search module 122. The search request specifies a geographic area and an investment type. In other examples, the search request may specify only a geographic area, only an investment type, or other combinations of search criteria. In some examples, the search request specifies additional investment criteria like property type, price range, and the like. Search module 122 processes the request and extracts the requested investment criteria from the search request. Search module 122 indicates the geographic area, investment type, and/or other investment attributes indicated by the request to data processing module 123.

Data processing module 123 identifies a set of candidate properties that have locations proximate to the geographic region and that have investment characteristics and investor activity similar to the specified investment type. Data processing module 123 compares the geographic region specified by the search request to the property locations indicated by the real estate data to identify potential properties to resolve the search request. Data processing module 123 selects ones of the properties that include locations proximate to the geographic region. For example, the geographic region may indicate a town or city and data processing module may select properties located within the town or city. Data processing module 123 compares the investment attributes specified by the search request with the investment data for the selected ones of the properties. Data processing module 123 selects ones of the properties that include investment characteristics and investor activity that correspond to investment type specified by the search request. For example, the investment type of the search request may include house flips, a price range, and a house size. In response, data processing module 123 identifies ones of the selected ones of the properties that include house flips, that fall within the price ranges, and that include a similar house size. For example, the house size specified by the search request may include 1500 square feet and the identified ones of the selected ones of the properties may include other properties between 1300 and 1600 square feet. In some examples, data processing module 123 executes a function or other type of algorithmic process to resolve the search request. The function may take geographic locations and investment types indicated by the search request as inputs. The function may output candidate properties that include similar locations and investment characteristics to those specified in the search request.

In some examples, data processing module 123 algorithmically resolves the search request based on the comparison to determine investment success metrics. Data processing module 123 may input one or more variables into an algorithm that outputs potential investment properties. The inputs may include a specified property, geographic region, investment type, the candidate properties, and/or any other input that helps identify potential investment properties that fit the user's desired criteria. The outputs may include the candidate properties and an investment success indicator that ranks the candidate properties. The ranks may sort properties into investment tiers. The investment success indicator may represent how likely the specified property will make a good investment. For example, investment success indicator may estimate a capitalization rate, appreciation, and/or some other type of success metric.

Data processing module 123 generates a search result based on the algorithm output. The search result identifies potential investment properties. In some examples, the search result further indicates whether individual potential investment properties are likely to be successful. Data processing module 123 forwards the search result to search module 122. Search module 122 transfers the search result for delivery to user device 101. In some examples, search module 122 may graphically display the potential investment properties on a map for delivery to user device 101. In some examples, search module 122 may list the potential investment properties and, if in some embodiments, the investment success metrics for the property for delivery to user device 101. For example, search module 122 may graphically format a user interface to present the search result on a display screen of user device 101.

FIGS. 4-12 illustrate exemplary operations of real estate search systems to perform comparative real estate investment searches. The real estate search systems illustrated in FIGS. 4-12 include exemplary user interface screen captures of real estate search system 100, however the user interfaces of real estate search system 100 may differ. For example, the user interface may include more or less information, have different formatting or coloring, use different icons, have a different layout, and/or the like.

Figure 4:
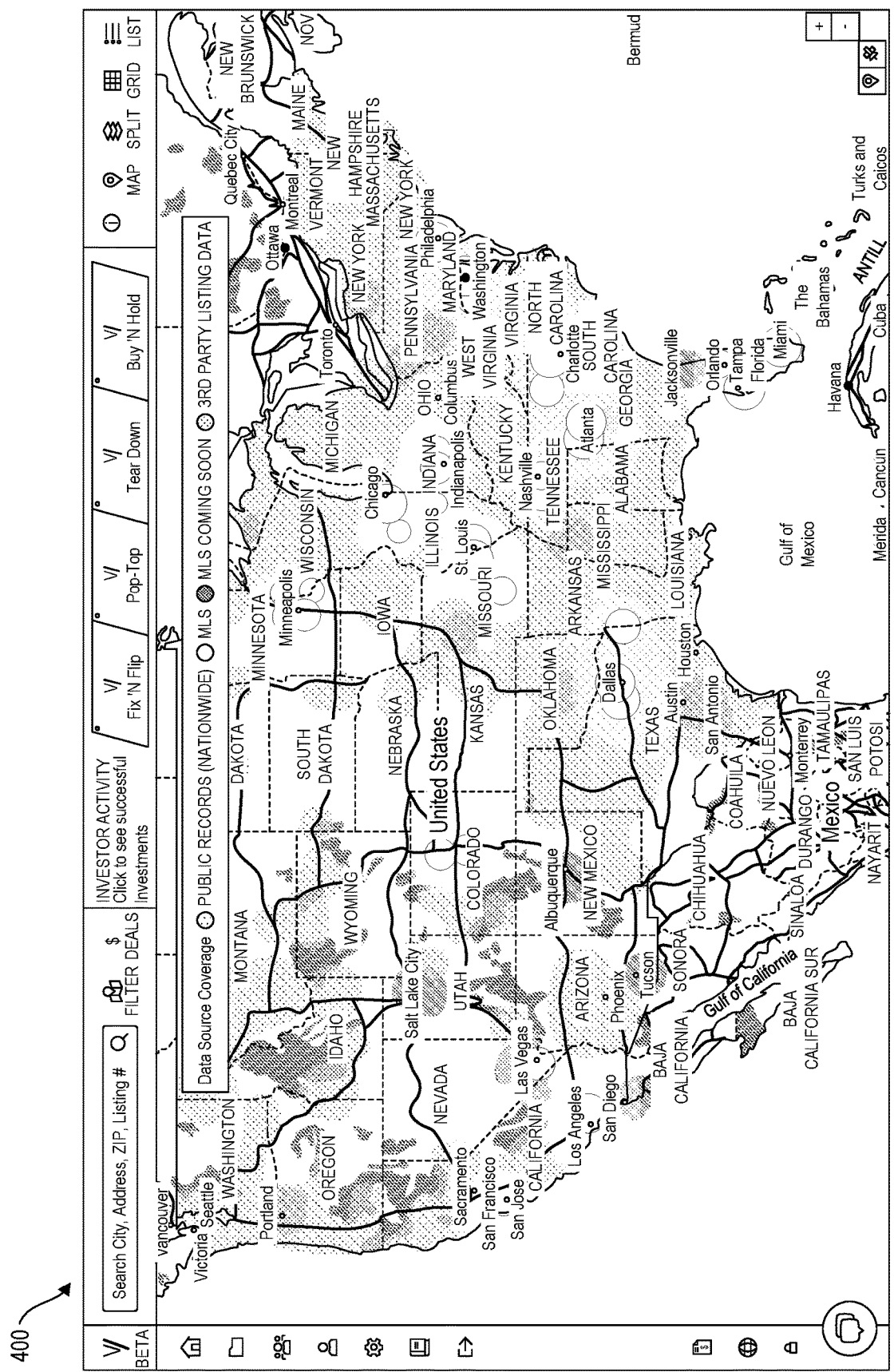
FIG. 4 illustrates an exemplary user interface of a real estate search system to perform comparative real estate investment searches.

Referring to the Figures, FIG. 4 illustrates exemplary user interface 400 of real estate search system 100. User interface 400 may facilitate comparative real estate investment searching. User interface 400 includes a map that depicts real estate investment activity and a search bar that allows a user to search for properties, addresses, geographic areas, and the like. The real estate investment activity is presented as a heat map with bubbles indicating activity. The bubbles include different shades that correspond to different data sources. In this example, the real estate data sources include public records, MLS data, $3^{rd}$ party listing data, and future MLS data. The size of the bubbles corresponds to the amount of property listings. In this example, a larger bubble indicates a larger number of listings for the area the bubble covers. The map includes a zooming function that allows a user to increase the resolution of the map to focus on a selected geographic region. For example, a user may zoom in to focus on a specific city or town. In this example, a user selects the Dallas, Texas metropolitan area on the map and user interface 400 transitions to user interface 500 as illustrated in FIG. 5.

Figure 5:
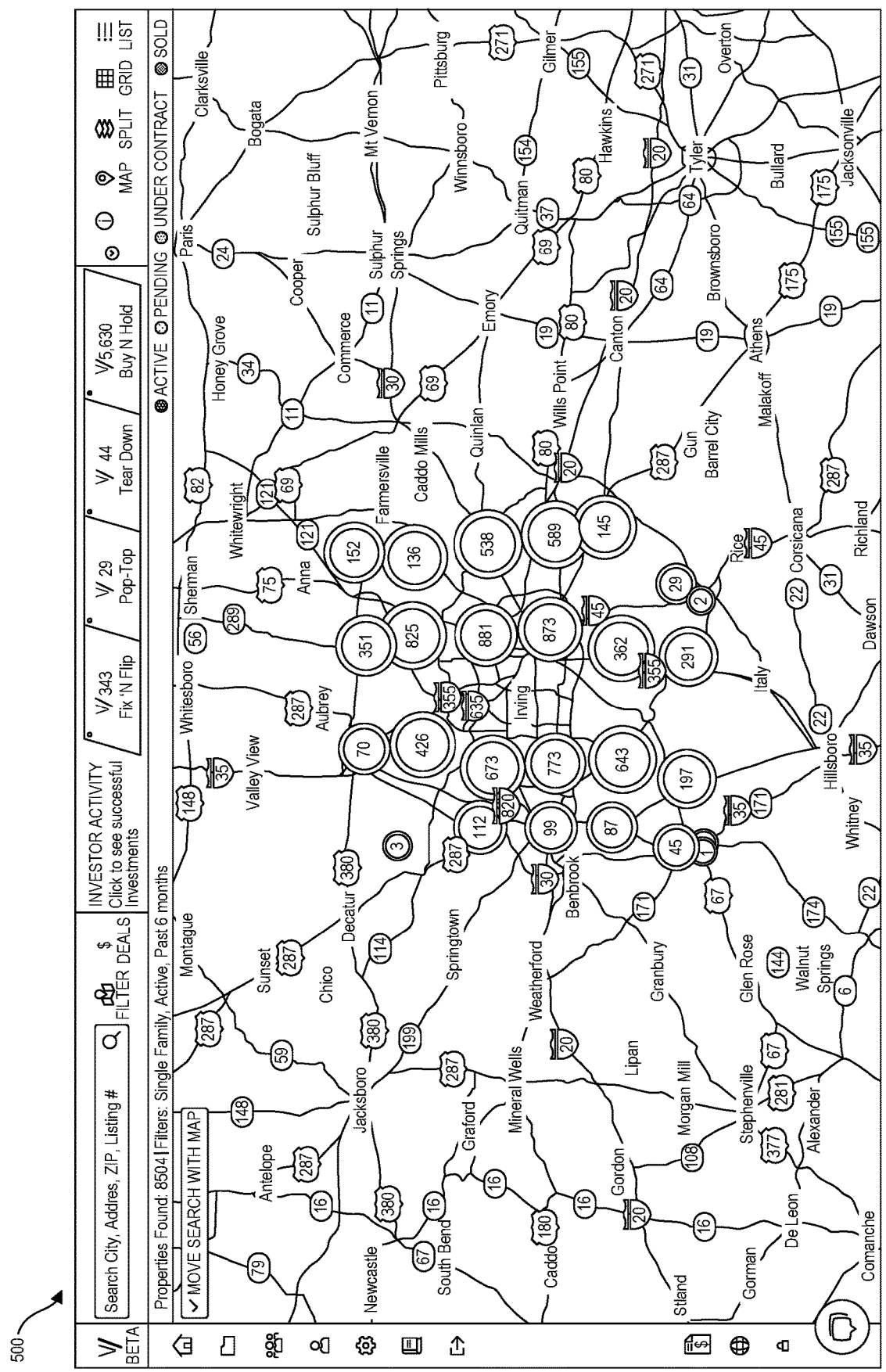
FIG. 5 illustrates an exemplary user interface of a real estate search system to perform comparative real estate investment searches.

FIG. 5 illustrates exemplary user interface 500 of real estate search system 100. In response to the user selection from FIG. 4, user interface 400 transitioned to user interface 500. User interface 500 may also facilitate comparative real estate investment searching. In this example, user interface 500 includes a map that depicts real estate investment activity in the Dallas metropolitan area and a search bar that allows a user to search for properties, addresses, geographic areas, and the like. In other examples, the region depicted by user interface 500 may differ. The real estate investor activity is presented as bubbles indicating activity. Each bubble includes a number that indicates the number of properties for the area that corresponds to the bubble. User interface 500 further includes a dashboard that categorizes the properties based on their investment characteristics. The dashboard categories include "Fix 'N Flip," "Pop-Top," "Tear Down," and "Buy 'N Hold." A Fix 'N Flip property includes a property with a short time period of ownership (e.g., six months) and a high price change. A Pop-Top property include a property that has a story change (e.g., one story→two story) between listings. A Tear Down property includes a property with two build dates. A Buy 'N Hold property includes a property that has been owned for an extended period of time without an owner present (e.g., absentee owner). The dashboard allows a user to select a category to filter the property listings. For example, a user may select the "Fix 'N Flip" category and user interface will display the Fix 'N Flip properties. The investment type categories may have preset configurations, semi-customized configurations, or fully customized configurations.

In some examples, user interface 500 categorizes real estate data and sorts the properties into the categories presented on user interface 500. For example, real estate search system 100 may apply a data structure to real estate data that indicates properties to identify Fix 'N Flip properties, Pop-Top properties, Tear Down properties, and Buy 'N Hold properties. However, real estate search system 100 may alternatively receive pre-categorized real estate data that indicates Fix 'N Flip properties, Pop-Top properties, Tear Down properties, and Buy 'N Hold properties. In some examples, user interface 500 may include additional and/or different categories for the properties. For example, user interface 500 may include categories for short-term rental properties and/or long-term rental properties.

In this example, a user selects one of the bubbles on the map and selects the "Fix 'N Flip" button on user interface 500. In response to the user selections, user interface 500 transitions to user interface 600 as illustrated in FIG. 6.

Figure 6:
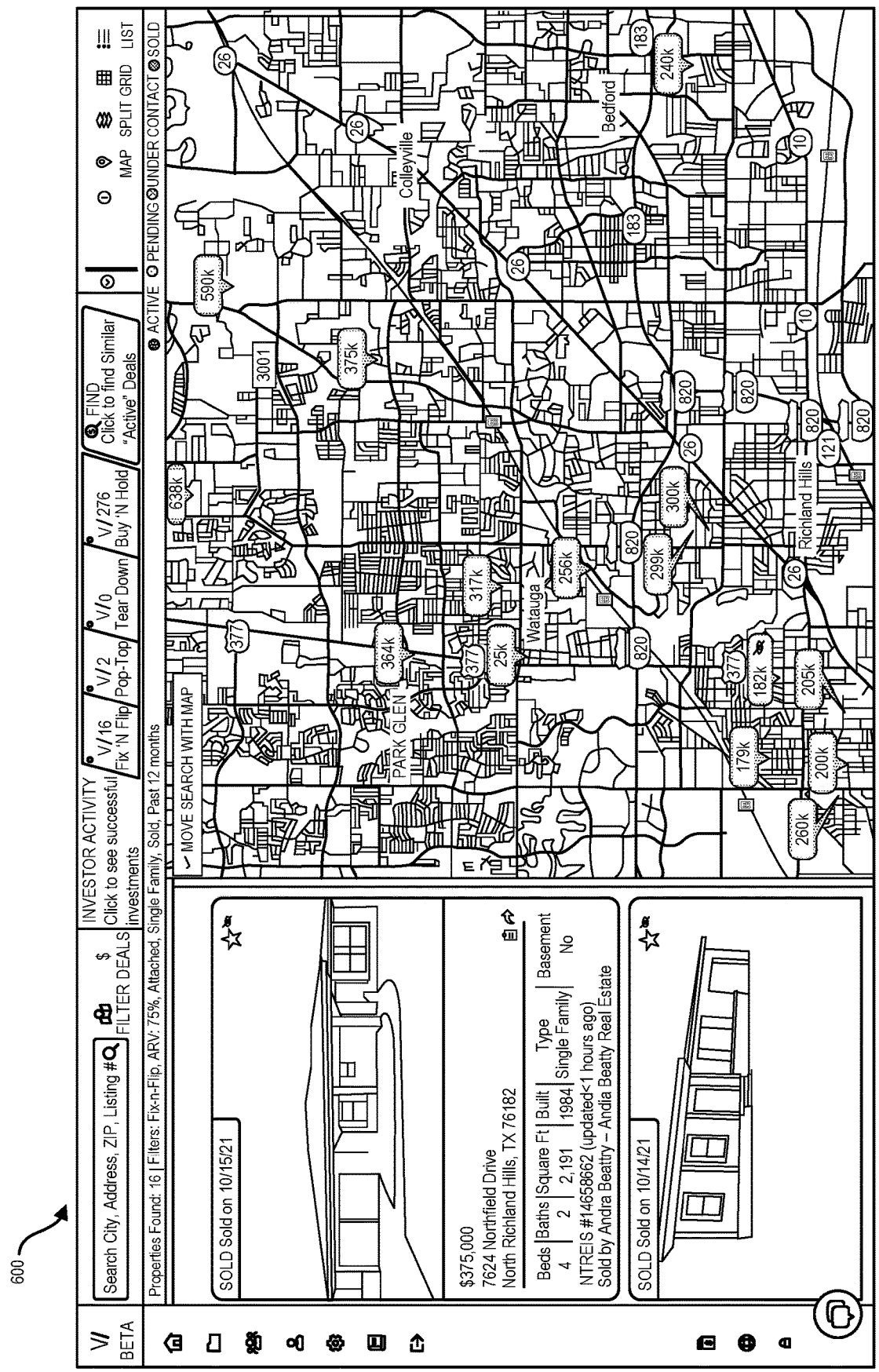
FIG. 6 illustrates an exemplary user interface of a real estate search system to perform comparative real estate investment searches.

FIG. 6 illustrates an exemplary user interface 600 of real estate search system 100. In response to the user selection from FIG. 5, user interface 500 transitioned to user interface 600. User interface 600 may also facilitate comparative real estate investment searching. User interface 600 includes a dashboard that categorizes the properties based on their investment type, a map that shows the locations of individual properties, and a side bar that lists individual properties and their characteristics. The properties illustrated on the map are indicated by bubbles that indicate the price and location of the property. The properties may be classified by house status like sold, active, under contract, pending, and the like. A user may interact with the map and select one of the properties. In response to the selection, user interface 600 may present the property and its characteristics in the sidebar. In this example, a user searched for properties that include Fix 'N Flip properties in the illustrated geographic region, however, in other examples, the search may differ. In response, user interface 600 presents the locations of identified Fix 'N Flip properties on the map and hides properties that do not include Fix 'N Flip properties. In other examples, a user may search for a different type of investment property and user interface 600 would subsequently display the selected type of investment property on the map and hide the Fix 'N Flip properties from view.

In this example, a user selects the "DEALS" button on the top of user interface 600 to locate potential Fix 'N Flip properties that are available for sale. In response to the user selection of the deal button, user interface 600 transitions to user interface 700 illustrated in FIG. 7.

Figure 7:
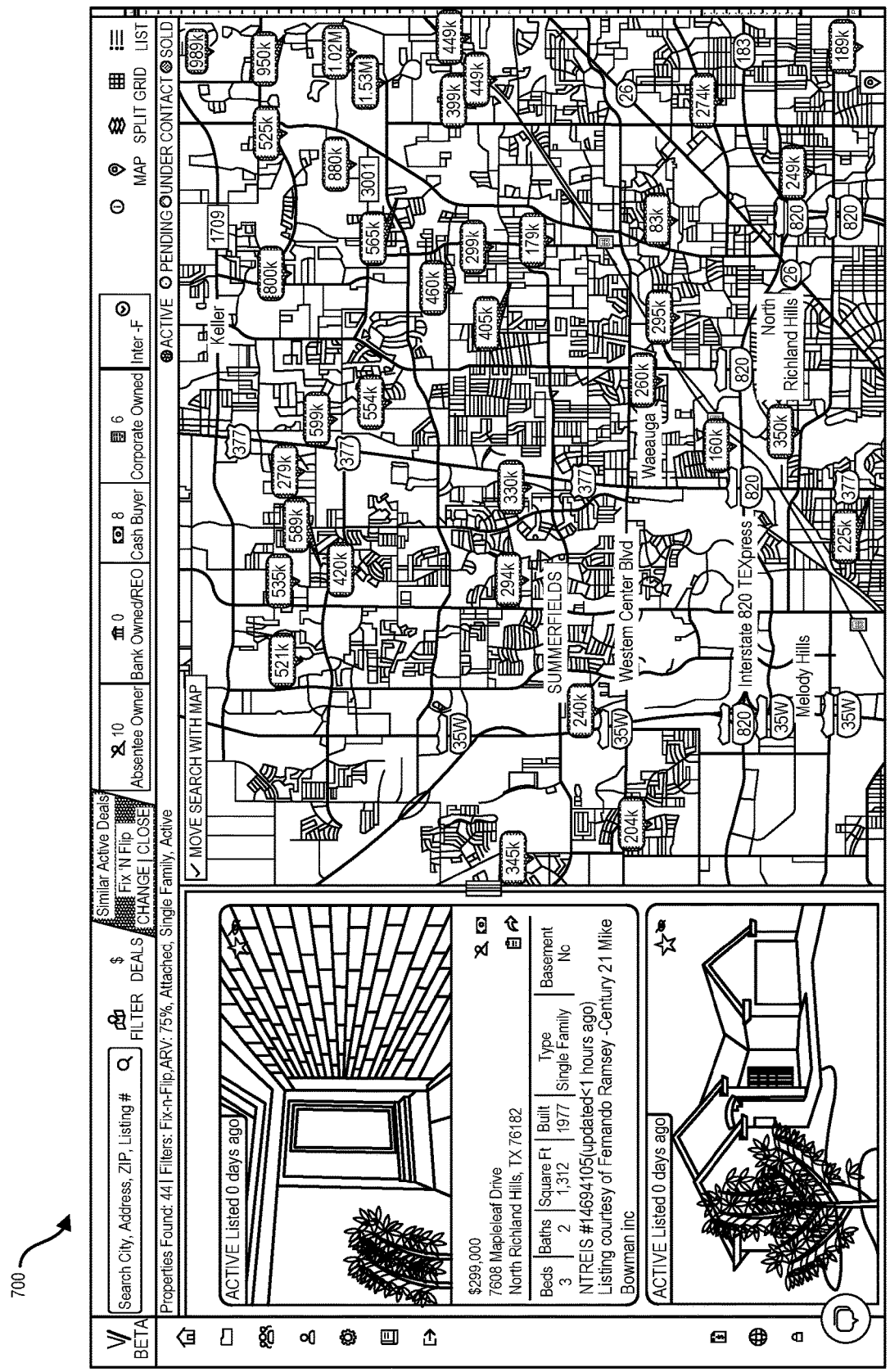
FIG. 7 illustrates an exemplary user interface of a real estate search system to perform comparative real estate investment searches.

FIG. 7 illustrates exemplary user interface 700 of real estate search system 100. In response to the user selection from FIG. 6, user interface 600 transitioned to user interface 700. User interface 700 may also facilitate comparative real estate investment searching. In this example, user interface 700 is filtering for Fix 'N Flip properties in response to user input and is displaying available Fix 'N Flip properties on the map and in the side bar. The filtering hides available properties from display on the map and sidebar that do not include Fix 'N Flip properties. A user may select the filtering option by interacting (e.g., clicking via a cursor) with user interface 700. In other examples, a different filtering option (e.g., Buy N' Hold) may be selected on user interface 700 which results in different properties that fall in the selected criteria to be displayed on the map. In response to a user selection of one of the Fix 'N Flip properties, user interface 700 presents pictures and investment characteristics of the selected property.

In this example, a user selects the one of the properties on the map to view the property and relevant detail regarding the property. In response to the user selection, user interface 700 transitions to user interface 800 illustrated in FIG. 8.

FIG. 8 illustrates an exemplary user interface 800 of real estate search system 100. In response to the user selection from FIG. 7, user interface 700 transitioned to user interface 800. User interface 800 may also facilitate comparative real estate investment searching. After a user selects one of the properties from the map, user interface 800 presents a front view of the property. User interface 800 further presents the location of the property on a map as well as other property characteristics like size and price. User interface 800 further presents a number of additional photos that may be selected by a user. Upon selection of one of the additional photos, user interface 800 enlarges the selected photo for view and minimizes the currently presented photo. In some examples, the view of the selected property presented by user interface 800 may differ. In some examples, user interface 800 may lack a photographic view of the property and instead present an alternate view of the property such as a satellite image.

In this example, a user selects the "COMPARABLES" tab to compare the currently selected property to other identified Fix 'N Flip properties in the vicinity of the selected property. In response to the user selection, user interface 800 transitions to user interface 900 illustrated in FIG. 9. It should be noted that the Fix 'N Flip selection is an example and that the search criteria may differ in other examples.

Figure 9:
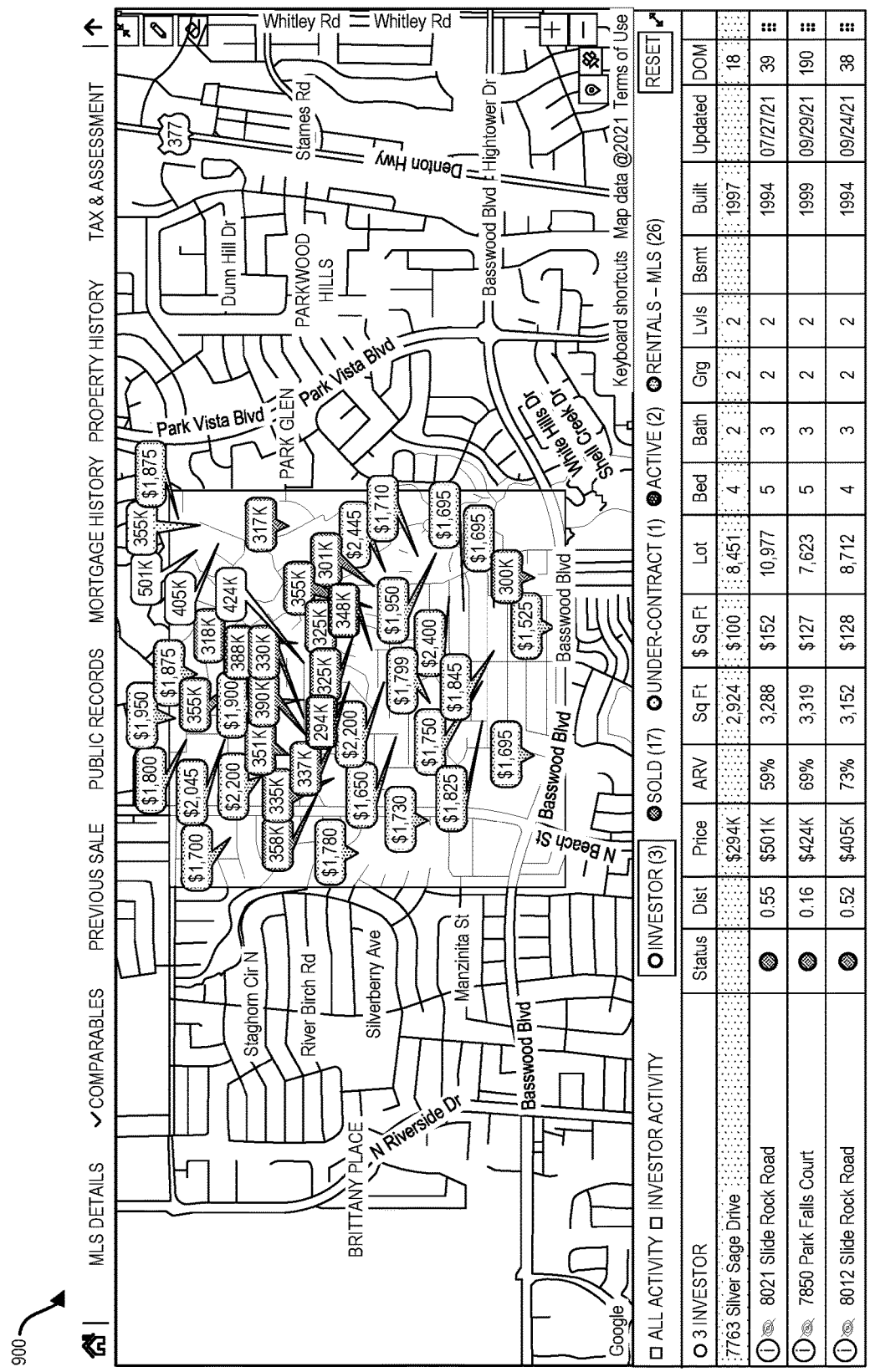
FIG. 9 illustrates an exemplary user interface of a real estate search system to perform comparative real estate investment searches.

FIG. 9 illustrates exemplary user interface 900 of real estate search system 100. In response to the user selection from FIG. 8, user interface 800 transitioned to user interface 900. User interface 900 may also facilitate comparative real estate investment searching. User interface 900 includes a map and a list of comparable properties. The map depicts a geographic area and a number of properties. The property indicated in white includes a property selection input by a user. The properties indicated in red include comparable properties to the selection that were previously sold. The properties indicated in yellow include comparable properties to the selection that are under contract to sell. The properties indicated in green include comparable properties to the selection that are up for sale. The properties indicated in black include comparable properties to the selection that are for rent. The properties indicated in blue include comparable properties to the selection that are investment properties. In this example, the comparable investment properties may include Fix 'N Flip investment properties, Buy N' Hold investment properties, Pop Top investment properties, Tear Down investment properties, short-term rental or long-term rental investment properties, and/or other types of investment properties. The colored indications show the selling/asking price of the properties as well as their locations on the map. It should be noted that the colors illustrated are not limited and user interface 900 may use different colors or shading techniques to distinguish the different types of properties.

User interface 900 lists investment characteristics for the investment properties. The investment characteristics include metrics like the selling price, one or more of After Repair Value (ARV), appreciation, size, price, short term rental equations, long term rental equations, capitalization rate, Return on Investment (ROI), cash-on-cash return, equity, net monthly cash flow, gross yield, net ROI, all in cost to ARV, net profit/sales process, holding time, asking price to sell ratio, and debt coverage ratio, size, number of rooms, and build year. In some examples, user interface 900 may list different, fewer, or additional investment characteristics for the properties. Advantageously, real estate search system 100 compares the price change for identified Fix 'N Flip properties to the potential Fix 'N Flip selected by a user. This comparison allows the user to efficiently and effectively estimate the return on investment for the selected property. It should be noted that the investment type may differ in other examples.

Real estate search system 100 utilizes algorithmic techniques to determine whether a given property constitutes a potentially successful investment property. The algorithm may take a given property, its geographic location, recognized investment equations, a deal strategy (e.g., Fix 'N Flip), and other comparable properties as inputs. The algorithm may output an indication as to whether the given property constitutes a potentially successful investment property. For example, when other nearby properties are identified as Fix 'N Flip properties that have a high ARV (e.g., 70%), the algorithm may determine that the given property has a high likelihood to be a successful Fix 'N Flip property. Likewise, when few other nearby are identified as Fix 'N Flip properties that have a low ARV (e.g., 10%), the algorithm may determine that the given property has a low likelihood to be a successful Fix 'N Flip property. When real estate search system 100 determines that a property is unlikely to result in a successful investment for a given investment strategy, user interface 900 omits those properties from searches. In other examples, the algorithm may take fewer, more, and/or different inputs to determine the investment potential for a given property.

In some examples, real estate search system 100 uses machine learning techniques, neural networks, and/or other types of artificial intelligence or computational processes to algorithmically determine which properties are potentially successful investments. For example, real estate search engine may train a neural network or other artificial intelligence system using MLS data and country record data to identify which listed properties are likely to be a successful investment.

In this example, a user selects the "HOME" icon on the top bar of user interface 900 to return to the search screen and selects user interface 900 to filter for available "Buy 'N Hold" properties. In response to the user selection, user interface 900 transitions to user interface 1000 illustrated in FIG. 10.

Figure 10:
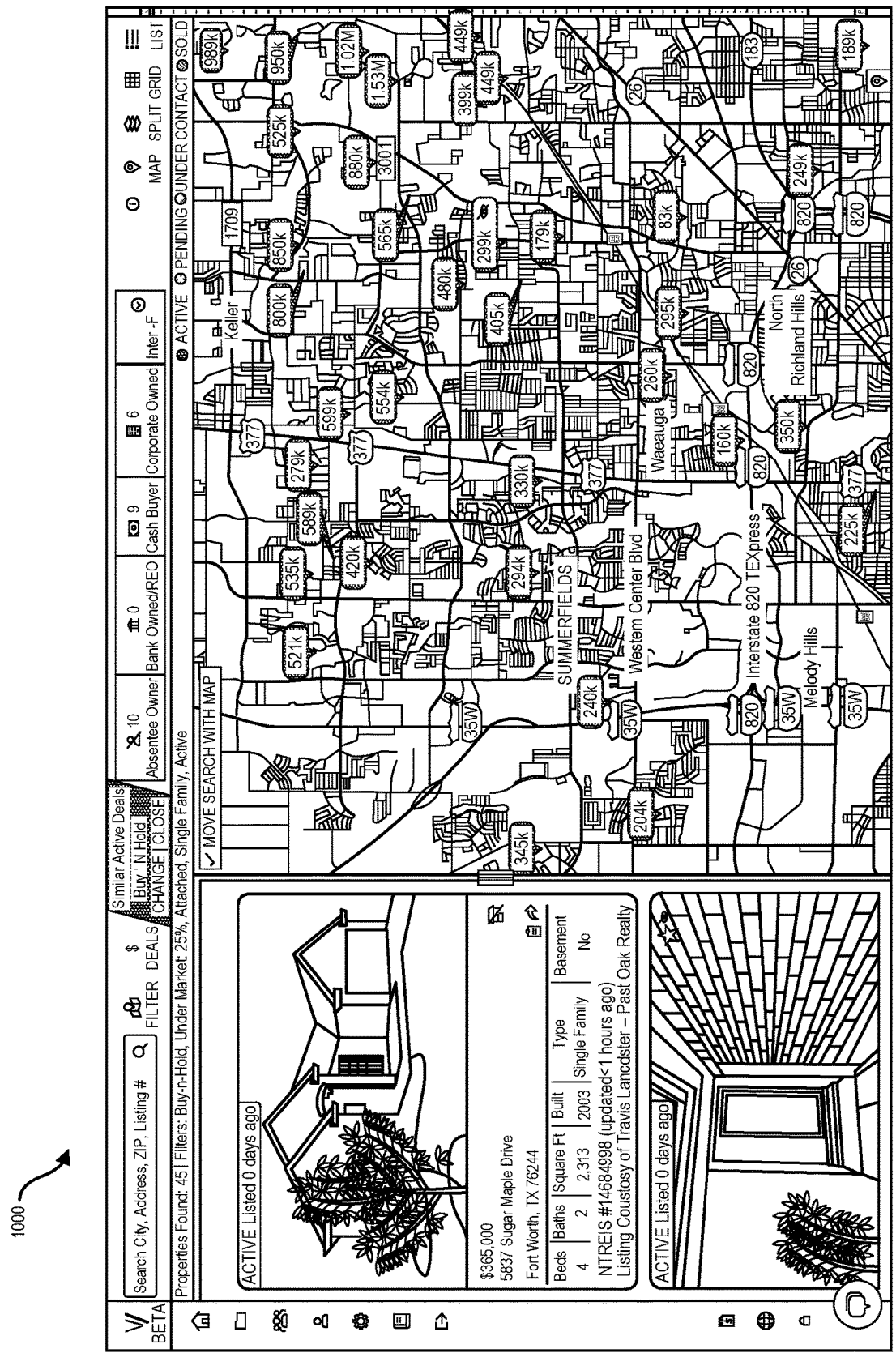
FIG. 10 illustrates an exemplary user interface of a real estate search system to perform comparative real estate investment searches.

FIG. 10 illustrates exemplary user interface 1000 of real estate search system 100. In response to the user selection from FIG. 9, user interface 900 transitioned to user interface 1000. User interface 1000 may also facilitate comparative real estate investment searching. User interface 1000 includes a map that illustrates geographic locations for properties, a side panel that lists properties, and a dashboard that allows a user to specify search criteria. In this example, a user searched for Buy 'N Hold properties in a given geographic region. Real estate search system 100 utilizes algorithmic methods to determine which available properties constitute likely successful investments for the selected investment strategy. When a user selects a different investment strategy (e.g., Fix 'N Flip), real estate search system 100 determines a different set of available properties for the selected search strategy and user interface 1000 responsively updates the map and side panel to show the new set of available properties. In this example, a user selects the "FILTER" button to further specify the search. In response to the user selection, user interface 1000 transitions to user interface 1100 illustrated in FIG. 11.

Figure 11:
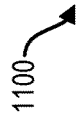
FIG. 11 illustrates an exemplary user interface of a real estate search system to perform comparative real estate investment searches.

FIG. 11 illustrates exemplary user interface 1100 of real estate search system 100. In response to the user selection from FIG. 10, user interface 1000 transitioned to user interface 1100. User interface 1100 may also facilitate comparative real estate investment searching. User interface 1100 includes multiple filters that allow a user to specify the type of property and type of investment. The filters include categories like single family, attached, condo, multi-family, active, pending, under-contract, land, and sold. The filter may be used to select investment strategies like Fix 'N Flip, Pop-Top, Tear Down, and Buy 'N Hold. In some examples, the investment strategies include categories like short term rental, long term rental, multi-family, land, off-market, mobile, and other types of investment strategy. The filter further includes an investment slider that indicates Under Market Value (UMV). In other examples, the slider may be used to control a different investment metric like After Repair Value (ARV). The sliders facilitate of user configurable investment strategies to tailor the search results presented in the user interfaces. In this example, a user selects the "RUN SEARCH" button and selects one of the properties that appears from the search. In response to the user selections, user interface 1100 transitions to user interface 1200 illustrated in FIG. 12.

Figure 12:
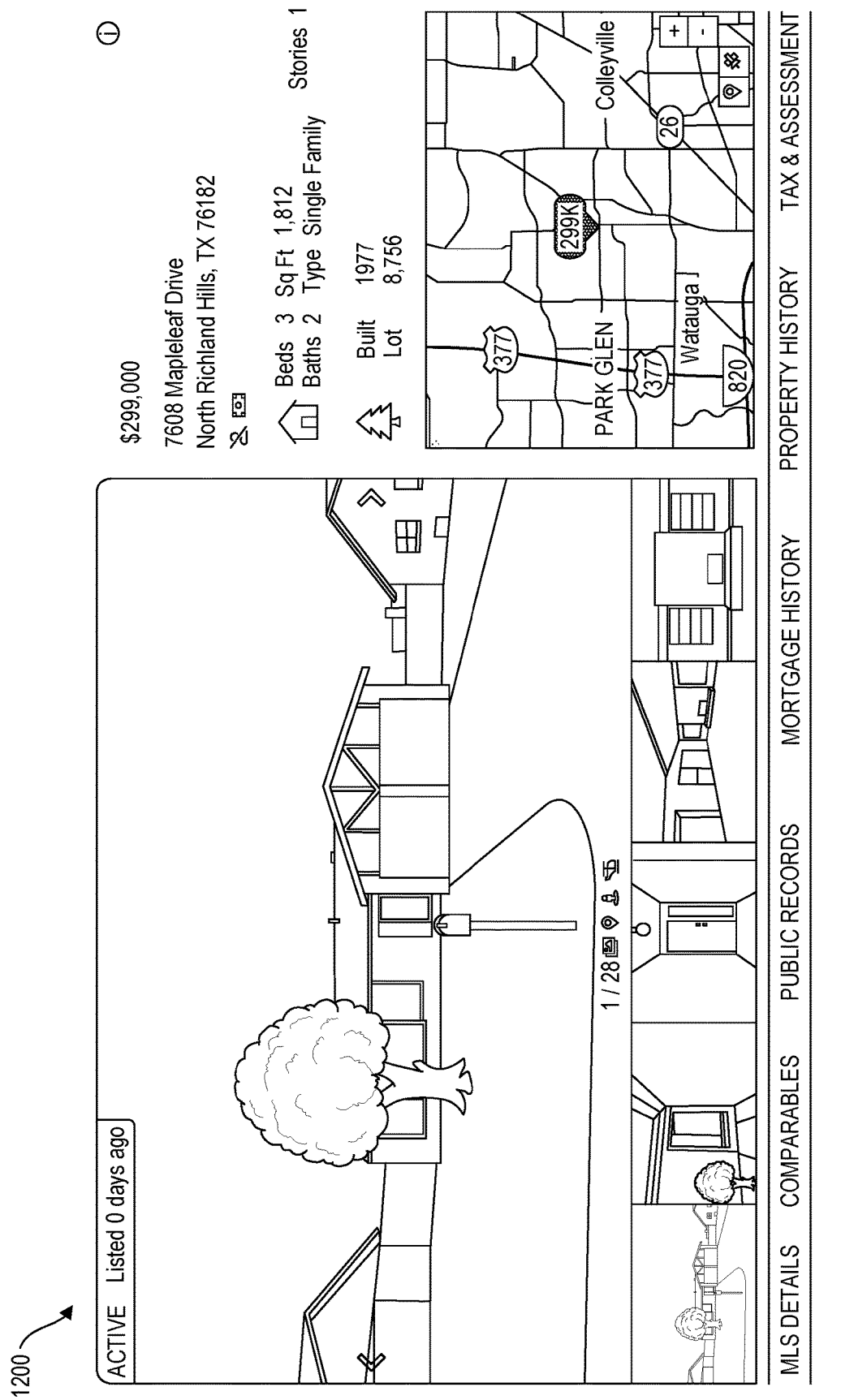
FIG. 12 illustrates an exemplary user interface of a real estate search system to perform comparative real estate investment searches.

FIG. 12 illustrates exemplary user interface 1200 of real estate search system 100. In response to the user selection from FIG. 11, user interface 1100 transitioned to user interface 1200. User interface 1200 may also facilitate comparative real estate investment searching. After a user selects one of the properties from the map, user interface 1200 presents a front view of the property. User interface 1200 further presents the location of the property on a map as well as other property characteristics like size and price. User interface 1200 further presents a number of additional photos that may be selected by a user. Upon selection of one of the photos, user interface 1200 enlarges the selected photo for view and minimizes the currently presented photo. In this example, a user selects the "COMPARABLES" button to compare the selected property to other nearby Buy 'N Hold properties. In response to the user selection, user interface 1200 transitions to user interface 1300 illustrated in FIG. 13.

Figure 13:
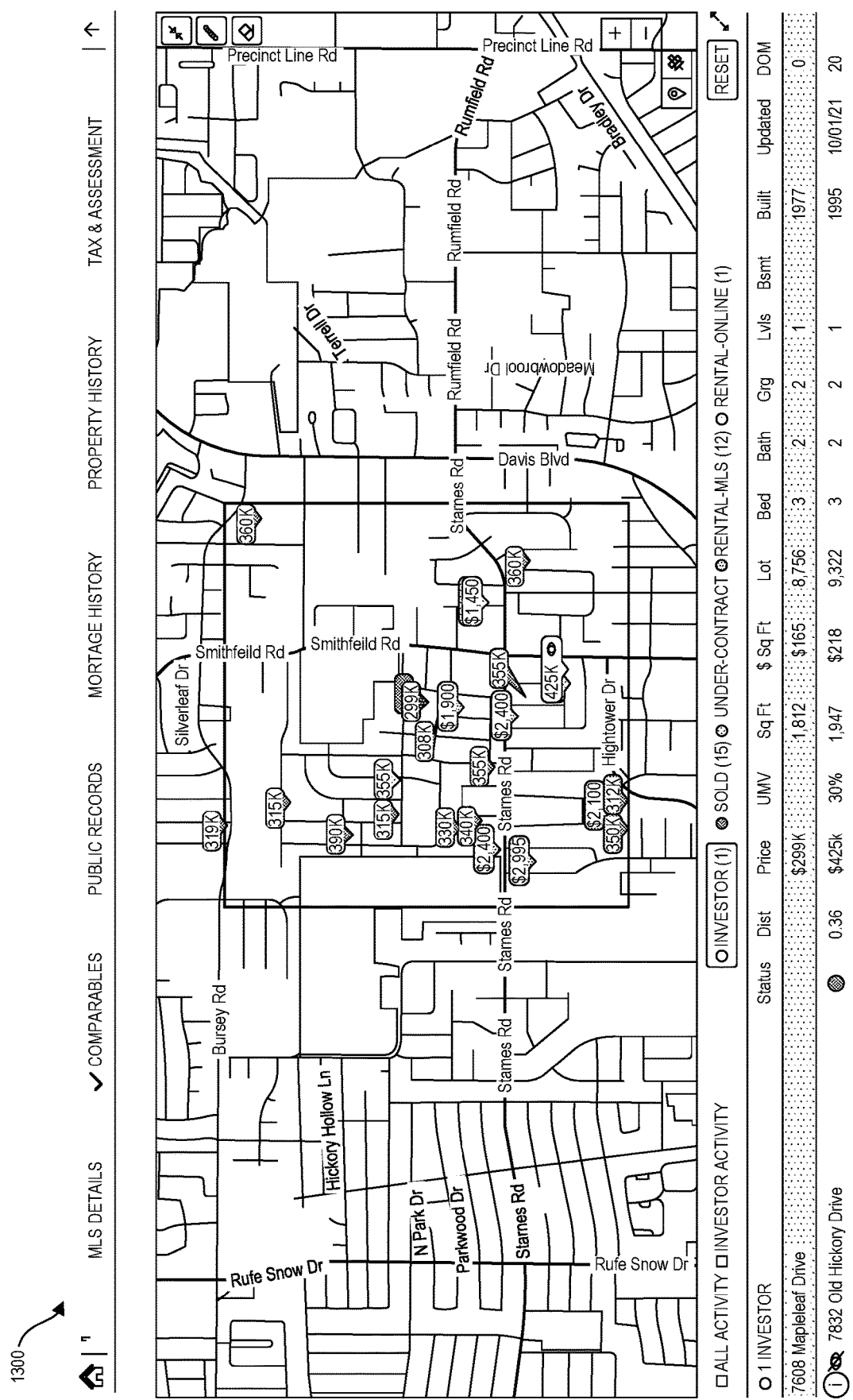
FIG. 13 illustrates an exemplary user interface of a real estate search system to perform comparative real estate investment searches.

FIG. 13 illustrates exemplary user interface 1300 of real estate search system 100. In response to the user selection from FIG. 12, user interface 1200 transitioned to user interface 1300. User interface 1300 may also facilitate comparative real estate investment searching. User interface 1300 includes a map and a list of comparable properties. The map depicts a geographic area and the locations of comparable properties that are categorized by color. White indicates a property user selection, red indicates previously sold properties, yellow indicates properties that are under contract to sell, green indicates for sale properties, black indicates rental properties, and blue indicates comparable investment properties. The colored indications show the selling/asking price of the properties as well as their locations on the map. User interface 1300 lists investment characteristics for the investment properties. The investment characteristics include metrics like the selling price, house characteristics, build year, and the like.

In a similar manner as illustrated on user interface 900, real estate search system 100 utilizes algorithmic techniques to determine whether a given property constitutes a potentially successful investment property. The algorithm may take a given property, its geographic location, a deal strategy, and other comparable properties as inputs. However, the geographic area and investment type selected by a user in user interface 1300 differ from the selections made in user interface 900. As a result, the algorithm implemented by real estate search system 100 outputs a different set of potentially successful investment property.

Figure 14:
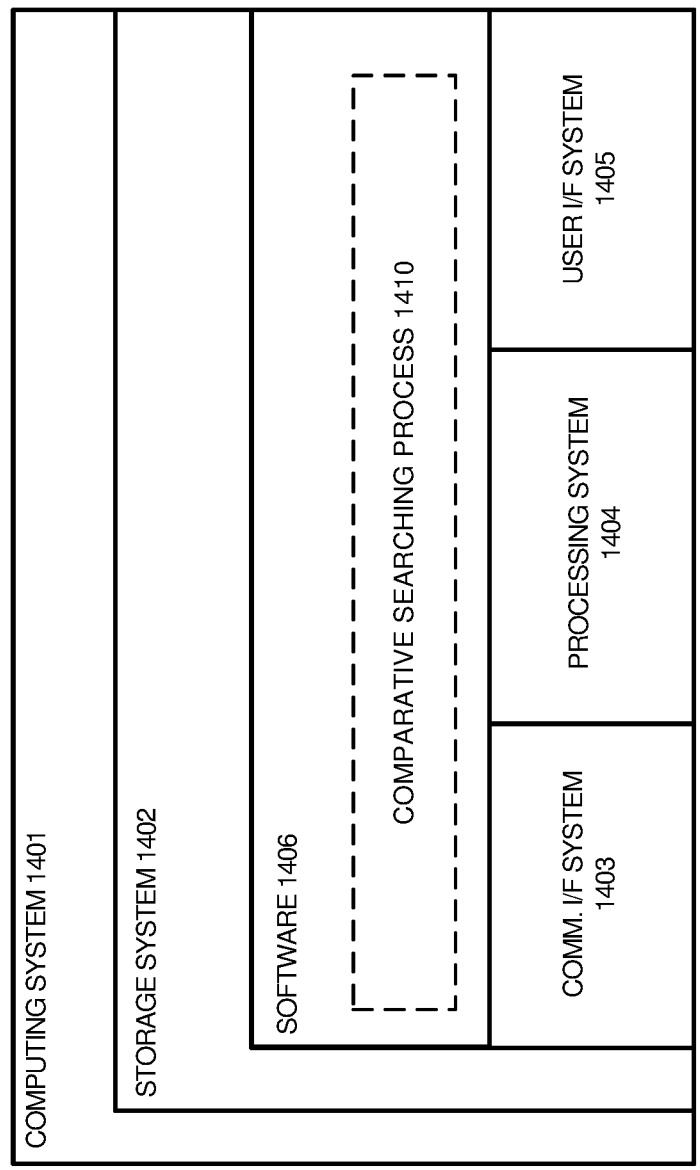
FIG. 14 illustrates an exemplary computer apparatus configured to perform comparative real estate investment searches.

FIG. 14 illustrates computing system 1401 according to an implementation of the present technology. Computing system 1401 is representative of any system or collection of systems in which the various processes, programs, services, and scenarios disclosed herein for performing comparative real estate investment searching may be implemented. For example, computing system 1401 may be representative of server 111, user device 101, and/or any other computing device contemplated herein. Examples of computing system 1401 include, but are not limited to, computers, servers, network controllers, web servers, and cloud computing platforms, as well as any other type of physical or virtual server machine, physical or virtual router, container, and any variation or combination thereof. Computing system 1401 may be implemented as a single apparatus, system, or device or may be implemented in a distributed manner as multiple apparatuses, systems, or devices. Computing system 1401 includes, but is not limited to storage system 1402, software 1403, communication interface system 1404, processing system 1405, and user interface system 1406. Processing system 1405 is operatively coupled with storage system 1402, communication interface system 1404, and user interface system 1406.

Processing system 1405 loads and executes software 1403 from storage system 1402. Software 1403 includes and comparative searching process 1410, which is representative of the comparative real estate searching processes discussed with respect to the preceding Figures including process 200 illustrated in FIG. 2 and the exemplary operation of system 100 illustrated in FIG. 3. When executed by processing system 1405, software 1403 directs processing system 1405 to operate as described herein for at least the various processes, operational scenarios, and sequences discussed in the foregoing implementations. Computing system 1401 may optionally include additional devices, features, or functionality not discussed here for purposes of brevity.

Processing system 1405 may include a micro-processor and other circuitry that retrieves and executes software 1403 from storage system 1402. Processing system 1405 may be implemented within a single processing device but may also be distributed across multiple processing devices or sub-systems that cooperate in executing program instructions. Examples of processing system 1405 include general purpose CPUs, GPUs, DSPs, ASICs, FPGAs, and logic devices, as well as any other type of processing device, combinations, or variations thereof.

Storage system 1402 may include any computer readable storage media device that is readable by processing system 1405 and capable of storing software 1403. Storage system 1402 may include volatile and nonvolatile, removable, and non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1402 may also include computer readable communication media over which at least some of software 1403 may be communicated internally or externally. Storage system 1402 may be implemented as a single storage device but may also be implemented across multiple storage devices or sub-systems co-located or distributed relative to each other. Storage system 1402 may include additional elements, such as a controller, capable of communicating with processing system 1405 or possibly other systems.

Software 1403 (comparative searching process 1410) may be implemented in program instructions and among other functions may, when executed by processing system 1405, direct processing system 1405 to operate as described with respect to the various operational scenarios, sequences, and processes illustrated herein. For example, software 1403 may include program instructions for ingesting real estate data, determining potential investment properties based on the real estate data, correlating the potential investment properties to investment and geographic attributes specified by a user generated search request, and surfacing the potential investment properties for review by the user.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1403 may include additional processes, programs, or components, such as operating system software, virtualization software, or other application software. Software 1403 may also include firmware or some other form of machine-readable processing instructions executable by processing system 1405.

In general, software 1403 may, when loaded into processing system 1405 and executed, transform a suitable apparatus, system, or device (of which computing system 1401 is representative) overall from a general-purpose computing system into a special-purpose computing system customized to identify properties that include investment attributes similar to investment attributes specified in a search request. The specific transformation of the physical structure may depend on various factors in different implementations of this description. Examples of such factors may include, but are not limited to, the technology used to implement the storage media of storage system 1402 and whether the computer-storage media are characterized as primary or secondary storage, as well as other factors.

For example, if the computer readable storage media are implemented as semiconductor-based memory, software 1403 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1404 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices for performing comparative real estate investment searching, it should be understood that the systems and methods described herein are not limited to such embodiments and may apply to a variety of other magnetometry environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "include," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a method claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a real estate investment search system to perform comparative searching, the method comprising:

ingesting real estate data from a plurality of data sources, wherein the real estate data includes information for a plurality of properties including corresponding property characteristics for each of the plurality of properties, current listing information for listed properties of the plurality of properties, and historical sales data for sold properties of the plurality of properties;

normalizing the real estate data from the plurality of data sources;

storing the normalized real estate data in a normalized data store;

deriving, based on the property characteristics for each of the plurality of properties, investment characteristics for each of the plurality of properties;

identifying investment properties of the sold properties based on the investment characteristics for each of the plurality of properties;

identifying investment type subsets of the investment properties of the sold properties, wherein each investment type subset of the investment properties of the sold indicates a particular investment type of a plurality of investment types;

generating investment data that indicates the investment characteristics and investor activity for each of the investment properties of the sold properties in the investment type subsets based on the real estate data;

receiving a search request that specifies a geographic area and a first investment type of the plurality of investment types;

identifying a subset of the listed properties based on the search request;

identifying investment properties from the investment type subset corresponding to the first investment type based on the search request;

determining, for each of the listed properties in the subset of the listed properties, an investment score corresponding to the first investment type, based at least in part on comparing the property characteristics of the respective listed property and the property characteristics of each identified investment property from the investment type subset, wherein determining the investment score comprises assigning a weight to each identified investment property from the investment type subset based on a geographic similarity between the respective listed property and each identified investment property from the investment type subset;

generating a graphical user interface, comprising:
an interactive map comprising the geographic area, wherein the interactive map includes:
one or more visually encoded indications of the subset of the listed properties, wherein each of the one or more visually encoded indications comprise a density characteristic corresponding to a number of the subset of the listed properties associated with a particular visually encoded indication of the one or more visually encoded indications,
selectable viewing elements indicating at least the investment score for the subset of the listed properties, and
selectable fine-tuning elements for modifying the interactive map;

receiving, via the graphical user interface, a selection of one of the selectable viewing elements; and
modifying the graphical user interface based on the selection, wherein modifying the graphical user interface comprises changing a viewable portion of the interactive map to:
display a different geographic area,
display a different one or more visually encoded indications of the subset of listed properties, and
display different selectable viewing elements.

2. The method of claim 1, wherein the comparing the property characteristics of the respective listed property and the property characteristics of each identified investment property comprises identifying the geographic area from the search request and locating one or more properties of the subset of the listed properties having property locations within the geographic area.

3. The method of claim 1, wherein the comparing the property characteristics of the respective listed property and the property characteristics of each identified investment property comprises identifying the investment type from the search request and selecting one or more properties of the subset of the listed properties that include investment characteristics and investor activity that correspond to the investment type.

4. The method of claim 1, wherein the comparing the property characteristics of the respective listed property and the property characteristics of each identified investment property comprises:
identifying the geographic area from the search request;
identifying the investment type from the search request;
locating one or more properties of the subset of the listed properties having property locations within the geographic area; and
selecting at least one property of the one or more properties of the subset of the listed properties that include investment characteristics and investor activity that correspond to investment type.

5. The method of claim 4, wherein determining the investment score further comprises:
identifying potential investment properties as the at least one property;
determining an investment success indicator for each of the potential investment properties;
ranking the potential investment properties based on their investment success indicators; and
indicating the ranking of the potential investment properties in the search result.

6. The method of claim 1, further comprising:
generating a map comprising an indication of a location of each of the listed properties in the subset of the listed properties; and
transmitting the map with the search result to a user device.

7. The method of claim 1, wherein the corresponding property characteristics for each of the listed properties in the subset of the listed properties is transmitted to a user device with the search result.

8. The method of claim 1, wherein the investment type comprises one or more of holding, flipping, tear down and rebuild, story addition, short-term rental, long-term rental, multi-family, land, off-market, and mobile.

9. The method of claim 1, wherein the investment characteristics comprise one or more of After Repair Value (ARV), appreciation, size, price, short term rental equations, long term rental equations, capitalization rate, Return on Investment (ROI), cash-on-cash return, equity, net monthly cash flow, gross yield, net ROI, all in cost to ARV, net profit/sales process, holding time, asking price to sell ratio, and debt coverage ratio.

10. The method of claim 1, wherein the plurality of data sources comprises one or more multiple listing source (MLS) for a specified region.

11. A real estate investment search system to perform comparative searching, the real estate investment search system comprising:
one or more processors; and
a memory having stored thereon instructions that, upon execution by the one or more processors, cause the one or more processors to:
ingest real estate data from a plurality of data sources, wherein the real estate data includes information for a plurality of properties including corresponding property characteristics for each of the plurality of properties, current listing information for listed properties of the plurality of properties, and historical sales data for sold properties of the plurality of properties;
normalize the real estate data from the plurality of data sources;
storing the normalized real estate data in a normalized data store;
derive, based on the property characteristics for each of the plurality of properties, investment characteristics for each of the plurality of properties;
identify investment properties of the sold properties based on the investment characteristics for each of the plurality of properties;
identify investment type subsets of the investment properties of the sold properties, wherein each investment type subset of the investment properties of the sold of properties indicates a particular investment type of a plurality of investment types;
generate investment data that indicates the investment characteristics and investor activity for each of the investment properties of the sold properties in the investment type subsets based on the real estate data;
receive a search request that specifies a geographic area and a first investment type of the plurality of investment types;
identify a subset of the listed properties based on the search request;
identify investment properties from the investment type subset corresponding to the first investment type based on the search request;
determine, for each of the listed properties in the subset of the listed properties, an investment score corresponding to the first investment type, based at least in part on comparing the property characteristics of the respective listed property and the property characteristics of each identified investment property from the investment type subset, wherein determining the investment score comprises assigning a weight to each identified investment property from the investment type subset based on a geographic similarity between the respective listed property and each identified investment property from the investment type subset;
generate a graphical user interface, comprising:
an interactive map comprising the geographic area, wherein the interactive map includes:
one or more visually encoded indications of the subset of the listed properties, wherein each of the one or more visually encoded indications comprise a density characteristic corresponding to a number of the subset of the listed properties associated with a particular visually encoded indication of the one or more visually encoded indications,
selectable viewing elements indicating at least the investment score for the subset of the listed properties, and
selectable fine-tuning elements for modifying the interactive map;
receive, via the graphical user interface, a selection of one of the selectable viewing elements; and
modify the graphical user interface based on the selection, wherein modifying the graphical user interface comprises changing a viewable portion of the interactive map to:
display a different geographic area,
display a different one or more visually encoded indications of the subset of listed properties, and
display different selectable viewing elements.

12. The real estate investment search system of claim 11, wherein the instructions to compare the property characteristics of the respective listed property and the property characteristics of each identified investment property further comprises instructions that, upon execution by the one or more processors, cause the one or more processors to identify the geographic area from the search request and locate one or more properties of the subset of the listed properties having property locations within the geographic area.

13. The real estate investment search system of claim 11, wherein the instructions to compare the property characteristics of the respective listed property and the property characteristics of each identified investment property further comprises instructions that, upon execution by the one or more processors, cause the one or more processors to identify the investment type from the search request and select one or more properties of the subset of the listed properties that include investment characteristics and investor activity that correspond to the investment type.

14. The real estate investment search system of claim 11, wherein the instructions to compare the property characteristics of the respective listed property and the property characteristics of each identified investment property further comprises instructions that, upon execution by the one or more processors, cause the one or more processors to:
identify the geographic area from the search request;
identify the investment type from the search request;
locate one or more properties of the subset of the listed properties having property locations within the geographic area; and
select at least one property of the one or more properties of the subset of the listed properties that include investment characteristics and investor activity that correspond to investment type.

15. The real estate investment search system of claim 14, wherein the instructions to determine the investment score further comprises instructions that, upon execution by the one or more processors, cause the one or more processors to:
identify potential investment properties as the at least one property;
determine an investment success indicator for each of the potential investment properties;
rank the potential investment properties based on their investment success indicators; and
indicate the rank of the potential investment properties in the search result.

16. The real estate investment search system of claim 11, wherein the memory comprises further instructions that, upon execution by the one or more processors, cause the one or more processors to:

generate a map comprising an indication of a location of each of the listed properties in the subset of the listed properties; and transmit the map with the search result to a user device.

17. The real estate investment search system of claim 11, wherein the corresponding property characteristics for each of the listed properties in the subset of the listed properties is transmitted to a user device with the search result.

18. The real estate investment search system of claim 11, wherein the investment type comprises one or more of holding, flipping, tear down and rebuild, story addition, short-term rental, long-term rental, multi-family, land, off-market, and mobile.

19. The real estate investment search system of claim 11, wherein the investment characteristics comprise one or more of After Repair Value (ARV), appreciation, size, price, short term rental equations, long term rental equations, capitalization rate, Return on Investment (ROI), cash-on-cash return, equity, net monthly cash flow, gross yield, net ROI, all in cost to ARV, net profit/sales process, holding time, asking price to sell ratio, and debt coverage ratio.

20. A non-transitory computer-readable storage device having stored thereon instructions that, upon execution by one or more processors, cause the one or more processors to: ingest real estate data from a plurality of data sources, wherein the real estate data includes information for a plurality of properties including corresponding property characteristics for each of the plurality of properties, current listing information for listed properties of the plurality of properties, and historical sales data for sold properties of the plurality of properties; normalize the real estate data from the plurality of data sources; storing the normalized real estate data in a normalized data store; derive, based on the property characteristics for each of the plurality of properties, investment characteristics for each of the plurality of properties; identify investment properties of the sold properties based on the investment characteristics for each of the plurality of properties; identify investment type subsets of the investment properties of the sold properties, wherein each investment type subset of the investment properties of the sold indicates a particular investment type of a plurality of investment types; generate investment data that indicates the investment characteristics and investor activity for each of the investment properties of the sold properties in the investment type subsets based on the real estate data; receive a search request that specifies a geographic area and a first investment type of the plurality of investment types; identify a subset of the listed properties based on the search request; identify investment properties from the investment type subset corresponding to the first investment type based on the search request; determine, for each of the listed properties in the subset of the listed properties, an investment score corresponding to the first investment type, based at least in part on comparing the property characteristics of the respective listed property and the property characteristics of each identified investment property from the investment type subset, wherein determining the investment score comprises assigning a weight to each identified investment property from the investment type subset based on a geographic similarity between the respective listed property and each identified investment property from the investment type subset; generate a graphical user interface, comprising: an interactive map comprising the geographic area, wherein the interactive map includes: one or more visually encoded indications of the subset of the listed properties, wherein each of the one or more visually encoded indications comprise a density characteristic corresponding to a number of the subset of the listed properties associated with a particular visually encoded indication of the one or more visually encoded indications, selectable viewing elements indicating at least the investment score for the subset of the listed properties, and selectable fine-tuning elements for modifying the interactive map; receive, via the graphical user interface, a selection of one of the selectable viewing elements; and modify the graphical user interface based on the selection, wherein modifying the graphical user interface comprises changing a viewable portion of the interactive map to: display a different geographic area, display a different one or more visually encoded indications of the subset of listed properties, and display different selectable viewing elements.

* * * * *